United States Patent [19]

Kishida et al.

[11] Patent Number: 4,567,873
[45] Date of Patent: Feb. 4, 1986

[54] AIR INTAKE SIDE SECONDARY AIR SUPPLY SYSTEM FOR AN INTERNAL COMBUSTION ENGINE

[75] Inventors: Eiji Kishida; Yoshinobu Isobe, both of Tokyo; Hiroaki Iwasaki, Niiza, all of Japan

[73] Assignee: Honda Giken Kogyo Kabushiki Kaisha, Tokyo, Japan

[21] Appl. No.: 688,480

[22] Filed: Jan. 3, 1985

[30] Foreign Application Priority Data

Jan. 18, 1984 [JP] Japan .................................. 59-6861

[51] Int. Cl.⁴ ........................................... F02M 23/04
[52] U.S. Cl. ..................................... 123/587; 123/589
[58] Field of Search ................................. 123/585–589

[56] References Cited

U.S. PATENT DOCUMENTS 4,483,308  11/1984  Hasegawa ............................ 123/589
4,495,922   1/1985  Fujimura et al. .................... 123/589
4,503,834   3/1985  Hasegawa ............................ 123/589

Primary Examiner—William A. Cuchlinski, Jr.
Attorney, Agent, or Firm—Pollock, Vande Sande and Priddy

[57] ABSTRACT

The so called air intake side secondary air supply system for an internal combustion engine, having first and second secondary air supply passages leading to an intake air passage on downstream side of a throttle valve is provided with a delay device in the second secondary air supply passage on upstream side of an open/close valve disposed in the second secondary air supply passage, and a pressure supply passage which provides communication between a pressure chamber of an air control valve disposed in the first secondary air supply passage and a part of the second secondary air supply passage between the delay device and the open/close valve. Thus, one of the secondary air supply passages is utilized as a passage for introducing a vacuum into the pressure chamber of the air control valve and the open/close valve is used as a switch device for switching over between the atmospheric pressure and the vacuum which are to be introduced into the pressure chamber of the air control valve.

3 Claims, 2 Drawing Figures

AIR INTAKE SIDE SECONDARY AIR SUPPLY SYSTEM FOR AN INTERNAL COMBUSTION ENGINE

BACKGROUND OF THE INVENTION

1. Field of the Invention

The present invention relates to an air-fuel ratio control system for an internal combustion engine, and more specifically to the so-called air intake side secondary air supply system for an internal combustion engine.

2. Description of Background Information

In an internal combustion engine provided with a three-way catalytic converter in the exhaust system, the air-fuel ratio of the engine is controlled around a stoichiometric value (14.7:1 for example) by a feedback control in accordance with the composition of the exhaust gas and operating conditions of the engine since an optimum operation of the three-way catalytic converter is enabled at the stoichiometric air-fuel ratio. The air intake side secondary air supply system for the feedback control is constructed such that an air intake side secondary air supply passage leading to downstream side of the throttle valve is provided and the air fuel ratio control is performed by varying the amount of the secondary air flowing through the air intake side secondary air supply passage.

As an example of the air intake side secondary air supply system, there is a system performing a pneumatic type PI (proportional and integral) control operation which is described in Japanese Patent Application No. 57-2127548 assigned to the same assignee of the present application. In this system, there are provided a pair of air intake side secondary air supply passages, both communicated to the downstream side of the throttle valve. The air-fuel ratio is detected in terms of a exhaused gas oxygen concentration and an air-fuel ratio signal is produced. The communication through one of the air intake side secondary air supply passages is controlled by means of an open/close valve operated in accordance with the air-fuel ratio signal. The other one of the air intake side secondary air supply passage is provided with an air control valve whose opening degree is controlled by the magnitude of the pressure applied to a pressure chamber thereof. The pressure chamber of the air control valve is supplied with one of first and second control pressure for respectively opening and closing the air control valve so that the sectional area of the other one of the air intake side secondary air supply passages is gradually increased or decreased.

With this type of arrangement, the air-fuel ratio is pneumatically controlled throughout a very wide control range.

However, in this type of pneumatic system, it was necessary to provide further devices such as an additional air control valve in the first one of the air intake side secondary air supply passages in order to control the amount of the secondary air flowing therethrough in accordance with the operating conditions of the engine. In addition, it was necessary to provide a three-way solenoid valve in order to introduce one of the first and second control pressure into the pressure chamber of the air control valve disposed in the second one of the air intake side secondary air supply passages. Thus, the problem of this type of pneumatic system was that a number of parts are required and the construction becomes complicated.

Thus, it is desired to provide a relatively low cost system of pneumatic type even through this type of systems do not cost higher than conventional air intake side secondary air supply systems of the type of electrically operated PI operation in which the control operations are performed by pulse motors.

An object of the present invention is therefore to provide an air intake side secondary air supply system of the type of pneumatic control which is relatively simple and costs less, while capable of the air fuel ratio control through a wide range without causing the deterioration of the driveability of the engine.

According to the present invention, the air intake side secondary air supply system includes first and second secondary air supply passages, both communicated to the downstream side of the throttle valve. The first secondary air supply passage is provided with an air control valve for controlling the amount of air flow according to the magnitude of the pressure supplied to a pressure chamber thereof and the second secondary air supply passage is provided with an open/close valve operated by an air-fuel ratio signal produced in accordance with an oxygen gas concentration. The invention features a delay means provided in the second secondary air supply passage, on the upstream side of the open/close valve and a pressure supply passage which provide a communication between the pressure chamber of the air control valve and a part of the second secondary air supply passage between the open/close valve and the delay device whereby the vacuum of the downstream side of the throttle valve is supplied to the pressure chamber of the air control valve through the second secondary air supply passage and the pressure supply passage when the open/close valve is open.

Further scope and applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

DETAILED DESCRIPTION OF A PREFERRED EMBODIMENT

The preferred embodiment of the present invention will be described hereinafter with reference to the accompanying drawings.

Figure 1:
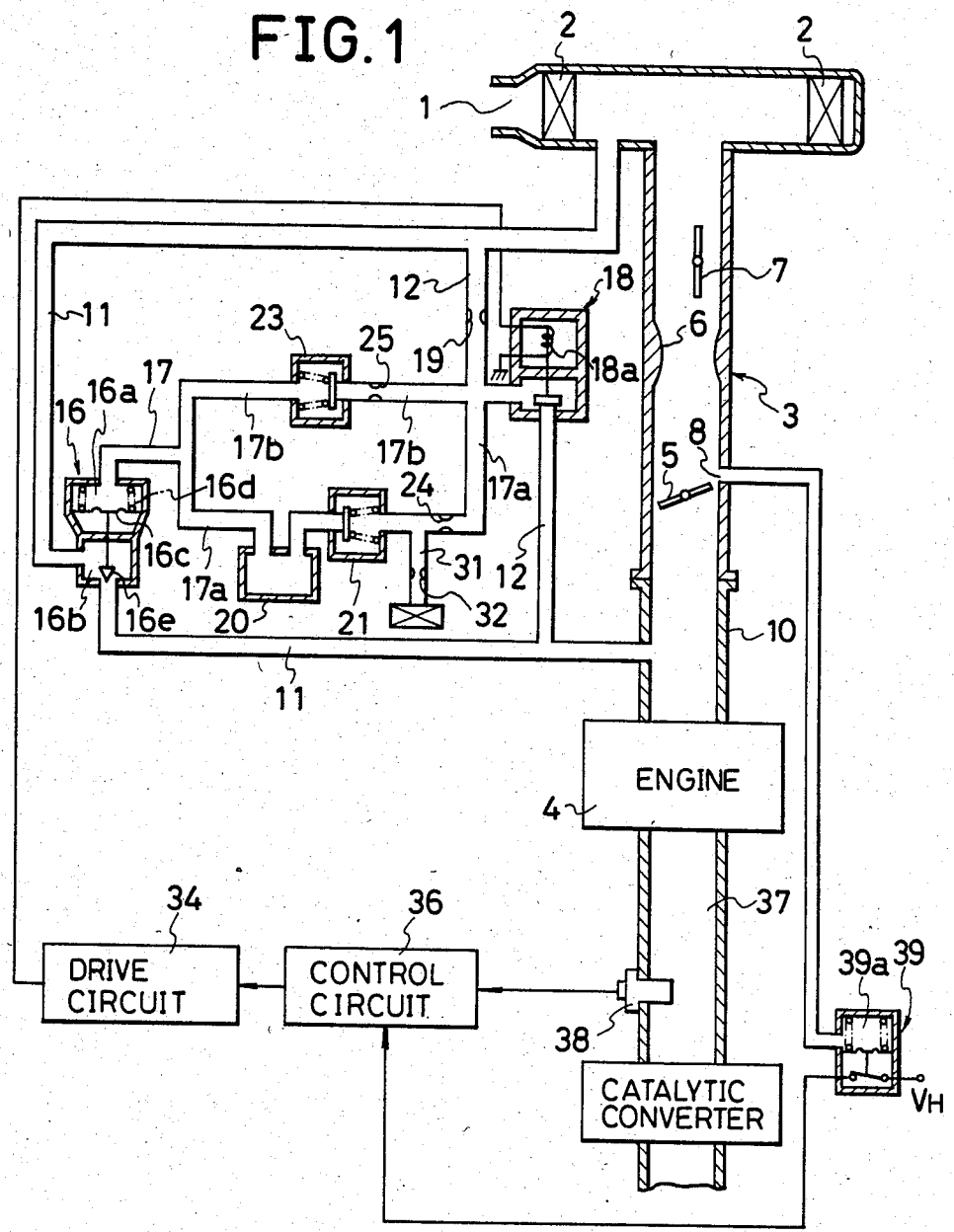
FIG. 1 is a schematic diagram illustrating the construction of an embodiment of the air intake side secondary air supply system of the present invention.

In FIG. 1, the intake air taken at an atmospheric air inlet port 1 is drawn into an internal combustion engine through an air cleaner 2, and a carburetor 3. The carburetor 3 has a throttle valve 5 and a venturi 6 formed on the upstream side of the throttle valve 5. A choke valve 7 is provided on the upstream side of the venturi 6. In the bore of the carburetor, a vacuum detection hole 8 is provided adjacent to the throttle valve 5 in such a manner that it is on the upstream side of the throttle valve 5 when it is closed and on the downstream side of the throttle valve 5 when it is opened. Intake side secondary air supply passages 11 and 12 are provided to make a communication between the inside of the air cleaner 2 in the vicinity of an air outlet port, and an intake manifold 10, downstream of the throttle valve 5. The secondary air supply passage 11 is provided with an air control valve 16 which is made up of a vacuum chamber 16a, a valve chamber 16b, a diaphragm 16c, a valve spring 16d, and a valve element 16e having a tapered form. The air control valve 16 varies the sectional area of the secondary air supply passage 11 in accordance with the magnitude of a vacuum supplied to the vacuum chamber 16a, so that the sectional area increases with the magnitude of the vacuum.

The air intake side secondary air supply passage 12 is provided with a solenoid valve 18 having a solenoid 18a. When the solenoid 18a, is deenergized, the air intake side secondary air passage 12 is closed and communication therethrough is made when the solenoid is energized. An orifice 19 is provided in the air intake side secondary air supply passage 12, on the upstream side of the solenoid valve 18. In addition, the air intake side secondary air supply passages 11 and 12 may, as shown, be respectively formed as a shunt passage communicated to the intake manifold 10.

A part of the air intake side secondary air supply passage 12 between the solenoid valve 18 and the orifice 19 is communicated with the pressure chamber 16a of the air control valve 16 by way of a pressure supply passage 17. The vacuum supply passage 17 is divided into two pressure supply passages 17a and 17b. The pressure supply passage 17a is provided with a surge tank 20 and a non-return valve 21 on the side of the air intake side secondary air passage 12 from the tank 20. The non-return valve 21 is arranged so as to allow only an air flow from the vacuum chamber 16a directed to the air intake side secondary air passage 12, i.e., the vacuum directed to the vacuum chamber 16a. On the other hand, the pressure supply passage 17b is provided with a second non-return valve 23 which is arranged to allow only an air flow directed to the vacuum chamber 16. In a part of the vacuum supply passages 17a and 17b, on the side of the air intake side secondary air passage 12 from the non-return valves 21, 23 are provided with orifices 24 and 25 respectively. In addition, an atmospheric pressure supply passage 31 with an orifice 32 is connected to the pressure supply passage 17a between the non-return valve 21 and the orifice 24.

The solenoid 18a of the solenoid valve 18 is connected to a control circuit 36 through a drive circuit 34. The control circuit 36 is further provided with an output signal of an oxygen sensor 38 which is mounted in an exhaust manifold 37 and produces an output signal having a level VO$_2$ corresponding to an oxygen concentration of an exhaust gas and which increases with the oxygen concentration. In addition to the drive circuit 34 and oxygen sensor 38, a Pc vacuum switch 39 is connected to the control circuit 36. The Pc vacuum switch 39 turns "on" when the magnitude of the vacuum Pc supplied to a vacuum chamber 39a thereof is smaller than a predetermined level P (30 mmHg for example), and a high level signal having a voltage V$_H$ is supplied to the control circuit 36.

Figure 2:
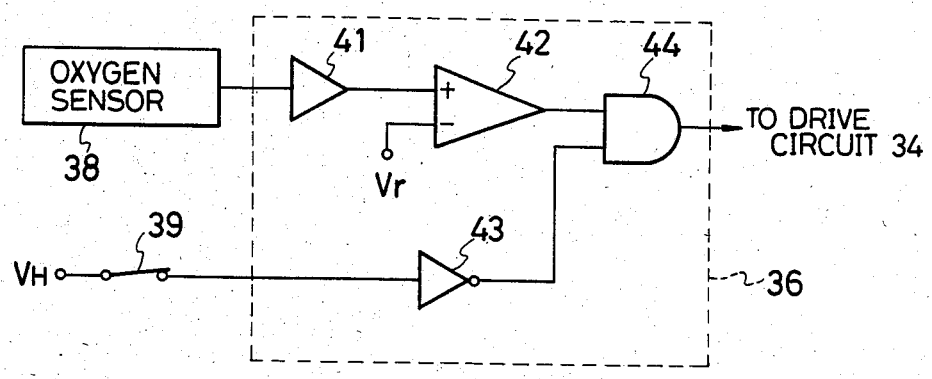
FIG. 2 is a block diagram showing the construction of the control circuit of the system shown in FIG. 1.

As shown in FIG. 2, the control circuit 39 is made up of a comparator 42 for comparing the output signal VO$_2$ of the exygen sensor 38 through a buffer 41 with a predetermined reference voltage Vr, an inverter 43 connected to an output terminal of the vacuum switch 39, and an AND circuit 44 for the calculation of the logical AND between the output signal of the comparator 42 and the output signal of the inverter 43. An output signal of the AND circuit 44 is supplied to the drive circuit 34.

The operation of the air intake side secondary air supply system of the invention having the above construction will be explained hereinafter.

In the control circuit 36, when the air-fuel ratio is rich, the output signal level VO$_2$ of the oxygen sensor 38 becomes higher than the reference level Vr (VO$_2 \geq$ Vr). Therefore, the comparator 42 produces a high level output signal. Conversely, when the air-fuel ratio is lean, the output signal level VO$_2$ of the oxygen sensor 38 becomes lower than the reference voltage Vr (VO$_2 <$ Vr). In this condition, the comparator 42 produces a low level output signal. During a normal operating condition of the engine, the vacuum switch 39 is in the off position. Therefore the output signal of the inverter 43 has the high level in this state. Accordingly, the output signal of the AND circuit 44 varies in the same manner as the output signal of the comparator 42. Thus, when the rich air-fuel mixture is detected from the level of the output signal of the oxygen sensor 38, the AND circuit 44 produces the high level output signal which in turn is supplied to the drive circuit 34 as a rich signal. When the air-fuel ratio is detected to be lean from the output signal of the oxygen sensor, the AND circuit 44 produces a low level output signal to be supplied to the drive circuit as a lean signal.

When the lean signal is supplied to the drive circuit 34, the solenoid 18a of the solenoid valve 18 is deenergized, thus the solenoid valve 18 is made closed. Conversely, when the rich signal is applied, the solenoid 18a is energized and the solenoid valve 18 is made open.

In response to the opening of the solenoid valve 18 from the closed state, the communication through the air intake side secondary air passage 12 is made and the secondary air is introduced into the intake manifold 10 through the orifice 19 of the air intake side secondary air supply passage 12 and the solenoid valve 18. On the other hand, vacuum P$_B$ within the intake manifold 10 is supplied to the vacuum chamber 16a through the solenoid valve 18 of the air intake side secondary air passage 12, the orifice 24 of the pressure supply passage 17a, the non-return valve 21, and the surge tank 20. Since the pressure within the vacuum chamber 16a gradually increases to reach the vacuum P$_B$ due to the effect of the residual pressures in the vacuum chamber 16a and the surge tank 20, and the effect of the orifice 24, the opening degree of the air control valve 16, that is, the sectional area of the air intake side secondary air passage 11 gradually increases. Thus, the amount of the air intake side secondary air is gradually increased. In this way, the secondary airs respectively flowing through the air intake side secondary air supply passages 11 and 12 are added together and then supplied to the engine 4. Therefore, the amount of the secondary air supplied to the engine gradually increases with them. In this state, since the non-return valve 23 is colsed by the vacuum P$_B$, the pressure supply passage 17b is colsed. The vacuum P$_B$ is diluted by the atmospheric air flowing into the air intake side secondary air supply passage 12 from the air cleaner 2 and the atmospheric pressure supply passage 31. Degree of the dilution is determined in accordance with the size of the orifices 19 and 32 and thus a fluctuation of the vacuum P$_B$ to be supplied to the pressure chamber 16a of the air control valve 16 of a large magnitude is prevented.

When, on the other hand, the solenoid valve 18 is closed from the open state, the air intake side secondary air supply passage 12 is colsed immediately. Therefore, the atmospheric pressure is supplied to the vacuum chamber 16a through the orifice 19, of the air intake side secondary air supply passage 12, orifice 25 and the non-return valve 23 of the pressure supply passage 17b. Since the pressure in the vacuum chamber 16a rapidly approaches to the atmospheric pressure level due to the effect of the residual vacuum in the vacuum chamber 16a and the effect of the orifices 19 and 25 while without being affected by the residual vacuum of the surge tank 20, the opening degree of the air control valve 16, that is, the sectional area of the air intake side secondary air supply passage 11 rapidly decreases to reduce the amount of the air intake side secondary air. Therefore, when the air intake side secondary air supply passage 12 is closed the secondary air is still supplied to the engine 4 through the air intake side secondary air supply passage 11 and the amount of the secondary air supply is gradually decreased with time.

When the solenoid valve 18 is closed, the non-return valve 21 is closed by the atmospheric pressure to be supplied to the vacuum chamber 16a, and in turn the pressure supply passage 17a is colsed. Thus, the atmospheric pressure is supplied to the vacuum chamber 16a without passing through the surge tank 20, resulting in a speed of the decrease of the air intake side secondary air by far faster than the speed of the increase thereof.

Therefore, when the air-fuel ratio is controlled by a feedback control, the rich signal and the lean signal is produced alternatively wihtout interruption. Therefore, in the air intake side secondary air supply passage 11, the amount of the secondary air is increased during the presence of the rich signal, and decreased during the presence of the lean signal. Thus, the integral (I) control is performed. In the air intake side secondary air supply passage 12, the secondary air flows intermittently and the proportional control (P) takes place. Therefore, the amount of the secondary air supplied to the intake manifold becomes a sum of the proportional control and the integral control.

When, on the other hand, the operating state of the engine 4 is turned to the decelerating state as the result of the closure of the throttle valve 5, the magnitude of the vacuum Pc supplied from the vacuum detection hole 8 to the vacuum switch 39 becomes smaller than the predetermined level and a high level output signal of the vacuum switch 39 is applied to the inverter 43. As a result, the output signal level of the inverter 43 turns to the low level. In this state, the AND circuit 44 provides the low level signal to the driving circuit 34 regardless of the level of the output signal of the comparator 42, that is, the output signal level of the oxygen sensor 38. The drive circuit 34 in turn stops the operation of the solenoid valve 18 as in the case in which the lean signal is applied thereto. With the unoperated solenoid valve 18, the atmospheric pressure is continuously supplied to the vacuum chamber 16a of the air control valve 16, and the air intake side secondary air passages 11 and 12 are colsed. Thus, the feedback control of the air-fuel ratio is stopped.

Thus, according to the present invention, two air intake side secondary air supply passages both leading to the intake air passage on the downstream side of the throttle valve is provided and one of the air intake side secondary air supply passages is provided with an open/close valve being operated in accordance with an air-fuel ratio signal and a delay device disposed on the upstream side of the open/close valve. The other one of the air intake side secondary air supply passage is provided with an air control value whose opening degree is controlled in accordance with the pressure applied to the pressure chamber thereof, and the communication between the pressure chamber of the air control valve and a part of the secondary air supply passage between the open/close valve and the delay means is provided by means of a pressure supply passage. Therefore, the vacuum of the downstream side of the throttle valve is suplied to the pressure chamber of the air control valve when the open/close valve is open, and the atmospheric pressure is introduced into the pressure chamber of the air control valve when the open/close valve is closed.

In short, one of the air intake side secondary air supply passages is utilized as the vacuum supply passage and the open/close valve is also operated as a switching means for changing over between the pressures to be introduced into the pressure chamber of the air control valve.

Thus, a PI control of the air-fuel ratio of the pneumatic type is realized by using relatively simple construction and the reduction of the cost with an efficient purification of the exhaust gas is enabled.

Further, if each of the pressure supply passage for introducing the vacuum and the presssure supply passage for introducing the atmospheric pressure into the pressure chamber of the air control valve is provided with an orifice and one of the pressure supply passage is provided with a surge tank as the above described embodiment, an integral control which is appropriate with respect to the operating conditions of the engine is enabled. This is because the speed of the increasing of the opening degree of the air control valve and the speed of the decreasing of the opening degree of the air control valve are arbitrarily determined by varying the size of the orifices and according to the presence or absence of the surge tank. Moreover, the air-fuel ratio with respect to a basic air-fuel ratio of the carburetor can be controlled throughout a wide range without deteriorating the driveability of the engine.

What is claimed is:

1. An air intake side secondary air supply system for an internal combustion engine having a carburetor and intake air passage with a throttle valve, comprising:
   an air-fuel ratio detection means for detecting an air-fuel ratio from an oxygen concentration of an exhaust gas of the engine and producing an air-fuel ratio signal;
   a first air intake side secondary air supply passage leading to the intake air passage on downstream side of the carburetor and the throttle valve;
   an air control valve disposed in said first air intake side secondary air supply passage and adapted to vary a sectional area of the first air intake side secondary air supply passage in accordance with a magnitude of a pressure supplied to a pressure chamber thereof;
   a second air intake side secondary air supply passage leading to the intake air passage on downstream side of the carburetor and the throttle valve;
   an open/close valve disposed in said second air intake side secondary air supply passage and opening and closing same in accordance with a content of said air-fuel ratio signal;

a delay means disposed in said second air intake side secondary air supply passage on upstream side of said open/close valve; and a pressure supply passage for providing communication between said pressure chamber of the air control valve and a part of said second air intake side secondary air supply passage between said open/close valve and said delay means.

2. An air intake side secondary air supply system as set forth in claim 1, wherein said pressure supply passage comprises a first pressure supply passage having an orifice and a non-return valve for introducing only vacuums into said pressure chamber, and a second pressure supply passage which is provided in parallel with said first pressure supply passage and has a second orifice and a non-return pressure supply valve for only introducing an atmospheric pressure into said pressure chamber.

3. An air intake side secondary air supply system as set forth in claim 2, wherein one of said first and second pressure supply passages is provided with a surge tank.

* * * * *